United States Patent [19]

Sekine

[11] Patent Number: 5,440,968
[45] Date of Patent: Aug. 15, 1995

[54] VARIABLE FORCE CYLINDER DEVICE

[75] Inventor: Akira Sekine, Ibaraki, Japan

[73] Assignee: SMC Kabushiki Kaisha, Tokyo, Japan

[21] Appl. No.: 159,293

[22] Filed: Nov. 30, 1993

[30] Foreign Application Priority Data

Dec. 1, 1992 [JP] Japan .................. 4-322013

[51] Int. Cl.6 .................. F01B 31/00; F15B 11/00
[52] U.S. Cl. .................. 92/6 R; 92/162 R; 91/519
[58] Field of Search .............. 92/6 R, 162 R; 91/20, 91/399, 410, 422, 519, 405

[56] References Cited

U.S. PATENT DOCUMENTS

| 1,241,691 | 10/1917 | White | 91/519 X |
|---|---|---|---|
| 2,293,334 | 8/1942 | Ernst | 91/519 X |
| 2,574,299 | 11/1951 | Sterett . | |
| 3,842,717 | 10/1974 | Prescott | 92/162 R X |
| 4,104,904 | 8/1978 | Yaguchi et al. | 91/399 X |
| 4,173,171 | 11/1979 | Lange | 91/399 X |
| 4,240,620 | 12/1980 | Tunkers | 91/399 X |
| 5,167,419 | 12/1992 | Robertson . | |

FOREIGN PATENT DOCUMENTS

| 2005472 | 8/1970 | Germany . | |
|---|---|---|---|
| 2223967 | 12/1972 | Germany | 91/405 |
| 2344657 | 3/1975 | Germany . | |
| 215831 | 11/1984 | Germany . | |
| 177409 | 11/1982 | Japan | 91/399 |

Primary Examiner—John E. Ryznic
Attorney, Agent, or Firm—Oblon, Spivak, McClelland, Maier & Neustadt

[57] ABSTRACT

A variable force cylinder device with a piston reciprocated by a pressurized fluid in a cylinder chamber, in which the piston has a large-diameter portion and a small-diameter portion, the cylinder chamber has a large-bore portion corresponding to the large-diameter portion of the piston and a small-bore portion corresponding to the small-diameter portion of the piston, and a variable force mechanism is provided for varying a pressure-receiving area of the piston under an interaction of the piston with the cylinder chamber varying depending on the phases of the piston stroke.

5 Claims, 7 Drawing Sheets

VARIABLE FORCE CYLINDER DEVICE

BACKGROUND OF THE INVENTION

1. Field of the Invention

This invention relates to a cylinder device, and more specifically to a variable force cylinder device in which a pressure-receiving area of a piston is altered depending on the travel distance of the piston in a cylinder chamber so that the force yielded by the piston is varied.

2. Description of the Related Art

A clamping device having a crank mechanism coupled to a cylinder device has been used to hold a workpiece.

In the cylinder device incorporated into such a clamping device, a piston is moved by a pressurized fluid introduced into a cylinder chamber and the reciprocating motion of the piston is transferred to the crank shaft to cause the crank arm to rotate. Conventionally, the force produced by the piston is constant regardless of the phases in a piston stroke, or the travel distance of the piston in the cylinder chamber. Therefore, the force for clamping the workpiece exerted by the crank arm is also kept constant regardless of the travel distance of the crank arm. Hence, there has been a danger of injury in which an operator has his/her hand or fingers pinched by the crank arm.

SUMMARY OF THE INVENTION

The present invention has been made to solve the above problem. Therefore, an object of the present invention is to provide a variable force cylinder device which outputs the force, the strength of which is altered depending on the travel distance of the piston in the cylinder chamber.

Such a cylinder device would be preferably used in a clamping device, for example, from a safety point of view as stated in the above.

In order to achieve the above object, there is provided a variable force cylinder device according to the present invention, which comprises: a piston having a large-diameter portion and a small-diameter portion; a cylinder chamber having a large-bore portion corresponding to the large-diameter portion of the piston and a small-bore portion corresponding to the small-diameter portion of the piston; and a variable force mechanism for altering a pressure-receiving area of the piston under an interaction of the piston with the cylinder chamber varying depending on the phases in the piston stroke.

The above and other objects, features and advantages of the present invention will become apparent from the following description and the appended claims, taken in conjunction with the accompanying drawings in which preferred embodiments of the present invention are shown by way of illustrative example.

DESCRIPTION OF THE PREFERRED EMBODIMENTS

Variable force cylinder devices according to the present invention will hereinafter be described in detail with reference to the accompanying drawings in which preferred embodiments are shown by way of illustrative example.

First Embodiment

Figure 1:
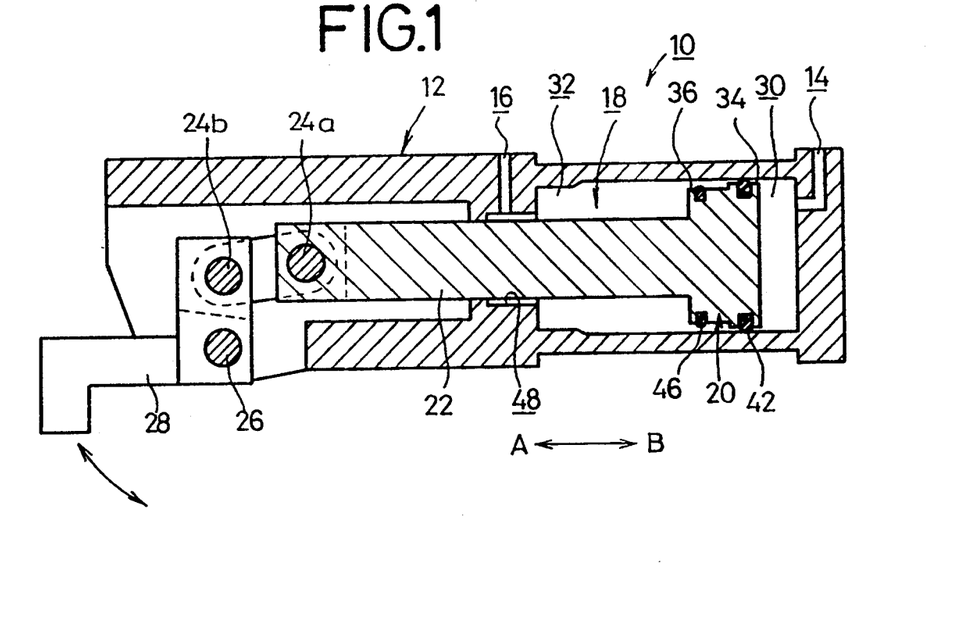
FIG. 1 is a vertical cross-sectional view showing the manner in which a piston employed in a variable force cylinder device is situated in a starting position.
Figure 2:
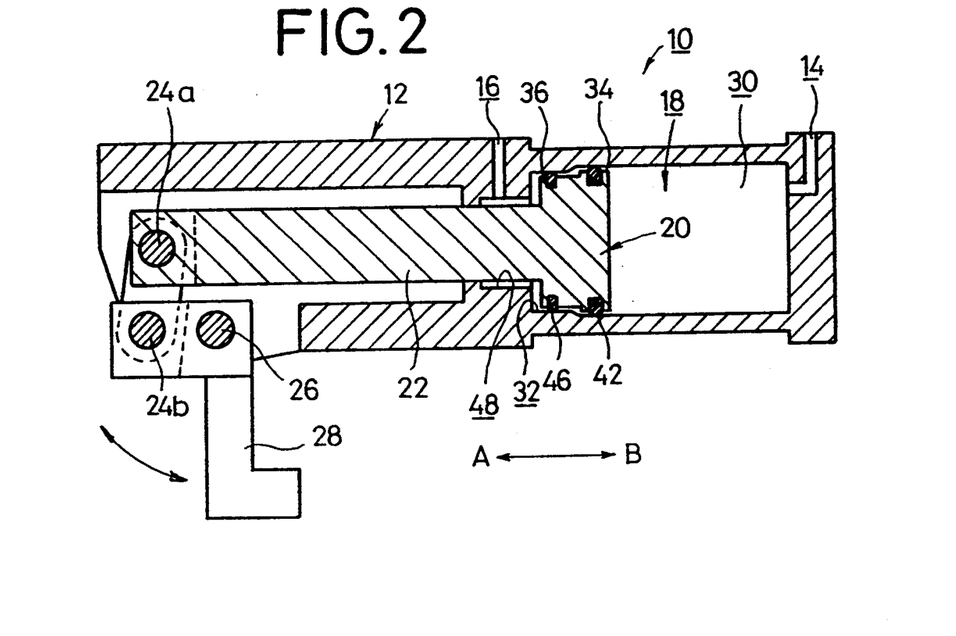
FIG. 2 is a vertical cross-sectional view illustrating the manner in which the piston is situated in a terminal position of a piston stroke.

FIG. 1 is a vertical cross-sectional view showing the manner of starting of a piston employed in a variable force cylinder device according to a first embodiment of the present invention. FIG. 2 is a vertical cross-sectional view illustrating the manner in which the piston employed in the variable force cylinder device shown in FIG. 1, has been moved to a terminal position of the piston stroke.

The variable force cylinder device 10 according to the first embodiment basically comprises a cylinder body 12, pressurized fluid discharge/intake ports 14 and 16 respectively defined in the cylinder body 12, a piston 20 slidably displaced in the direction indicated by an arrow A or B within a cylinder chamber 18 defined in the cylinder body 12, a piston rod 22 connected to the piston 20, and a bent arm 28 coupled to a leading end portion of the piston rod 22 by pins 24a and 24b and connected thereto so as to be rotatable in the direction indicated by an arrow about a crank pin 26.

The cylinder chamber 18 has a large-bore portion 30 which communicates with the port 14, and a small-bore portion 32 which communicated with the port 16 and has an inner diameter smaller than that of the large-bore portion 30. In this arrangement, the piston 20 reciprocates between the large-bore portion 30 and the small-bore portion 32.

The piston 20 is made up of a large-diameter portion 34 having a large outer diameter and a small-diameter portion 36 having a small outer diameter.

Figure 3:
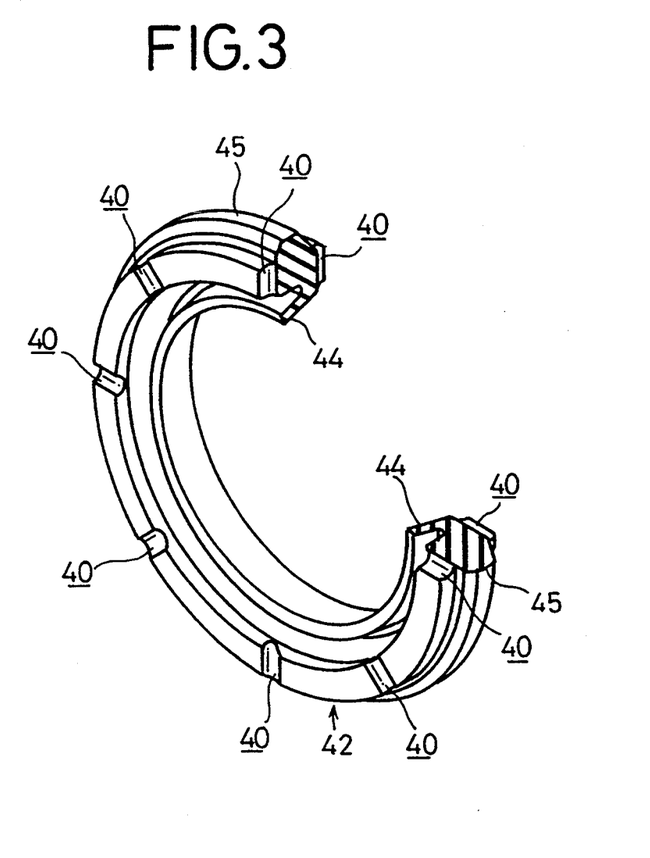
FIG. 3 is a perspective view partly in section showing a ring member serving as a check valve.

An annular groove 38 is defined in the large-diameter portion 34 of the piston 20 (see FIG. 4). A check valve 42 having a ring body in which a plurality of concave portions 40 are defined at predetermined intervals as shown in FIG. 3 is fitted in the annular groove 38. A bent portion 45, which has a tongue 44 provided on the inner periphery side of the check valve 42 and fixed or bent in the direction indicated by arrow and which is provided on the outer periphery side of the check valve 42, abuts against the peripheral wall surface of the large-bore portion 30.

A seal ring 46 is mounted on the small-diameter portion 36 of the piston 20. The seal ring 46 is brought into contact with the wall surface of the small-bore portion 32 to carry out a sealing function. Incidentally, an annular clearance 48 is provided in the cylinder body 12 so as to communicate with the small-bore portion 32 and the port 16.

The variable force cylinder device 10 according to the present embodiment is basically constructed as described above. Operation of the variable force cylinder device 10 will next be described below.

Figure 4A:
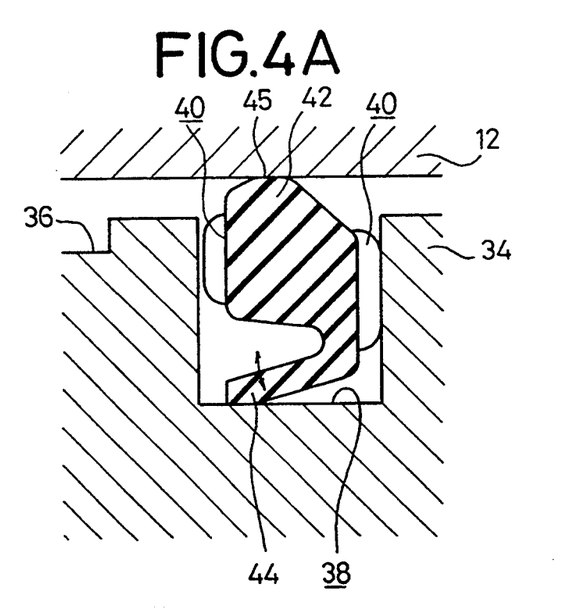
FIG. 4 is a cross-sectional view illustrating the operation of the check valve.
Figure 4B:
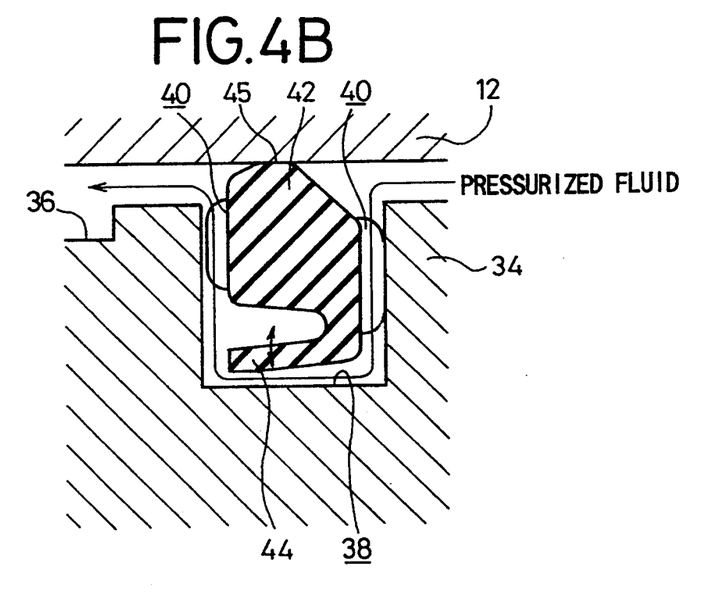

A pressurized fluid is first supplied from an unillustrated pressurized-fluid supply device to the variable force cylinder device 10 through the port 14. Here, the port 16 is set to a half-opened state so as to allow the passage of a slight pressurized fluid by an unillustrated solenoid-controlled valve. The pressurized fluid introduced through the port 14 passes through the check valve 42 along a path indicated by an arrow in FIG. 4B so as to enter into the small-bore portion 32 on the piston rod 22 side. Thus, the large-bore portion 30 in the cylinder chamber 18 communicates with the small-bore portion 32, so that the front and rear pressures of the piston 20 are actually balanced. As a result, only a portion corresponding to a sectional area of the piston rod 22 serves as a pressure-receiving area. Thus, the piston 20 is moved in the direction of the piston stroke by a pressing force of the pressurized fluid, which acts on the sectional area of the piston rod 22.

Incidentally, the pressurized fluid introduced into the small-bore portion 32 passes through the annular clearance 48 so as to be discharged into the outside through the port 16. Here, the piston rod 22 moves in the direction indicated by the arrow A like the piston 20 and the arm 28 is rotated a predetermined angle in the direction indicated by the arrow about the crank pin 26.

Thus, since the force a bring on the piston 20 toward the piston rod 22 is relatively weak until the piston 20 reaches the terminal position of its stroke, a clamping force of the arm 28 is also maintained as to be weak. As a result, injury can be avoided even if tile operator's hand is inadvertently pinched by the turning arm 28.

When the piston 20 approaches the terminal position of its stroke shown in FIG. 2, and the seal ring 46 mounted on the small-diameter portion 36 of the piston 20 comes in contact with the wall surface of the small-bore portion 32 of the cylinder chamber 18, the pressurized fluid which leaks through the check valve 42 is blocked by the seal ring 46 from entering into the rear of the piston 20. Thus, the pressurized fluid supplied from the port 14 acts on the total sectional area of the large-diameter portion 32 of the piston 20 in the terminal position of its stroke shown in FIG. 2. Since the force acting on the piston 20 toward the piston rod 22 becomes strong, the workpiece can be reliably clamped by the arm 28.

On the other hand, when the pressurized fluid is introduced through the port 16, the pressurized fluid passes through the annular clearance 48 and acts on a pressure-receiving surface of the small-diameter portion 36 of the piston 20. When the piston 20 is displaced in the direction indicated by the arrow B and the seal ring 46 of the piston 20 reaches the large-bore position 30, the sealing effect of the seal ring 46 is lost. However, the tongue 44 of the check valve 42 is flexed in the direction indicated by the arrow shown in FIG. 4A and prevents the pressurized fluid from leaking into the port 14 side. Accordingly, the piston 20 can travel to the original position shown in FIG. 1.

Second Embodiment

Figure 5:
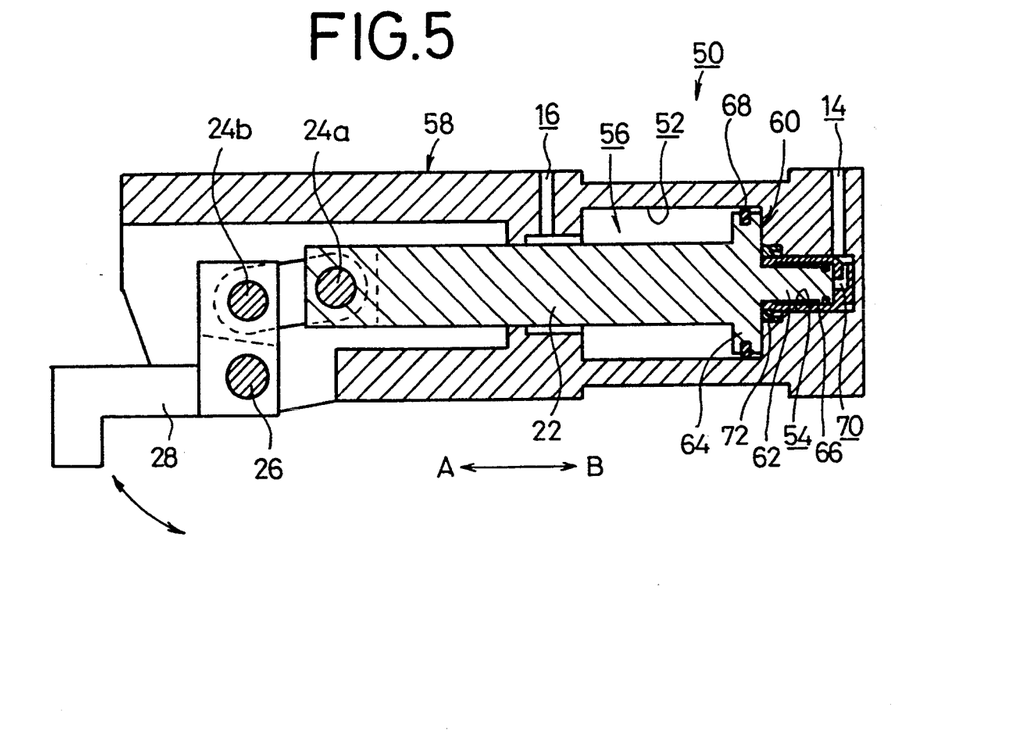
FIG. 5 is a vertical cross-sectional view showing the manner in which a piston employed in a variable force cylinder device according to a second embodiment of the present invention is situated in a starting position.
Figure 6:
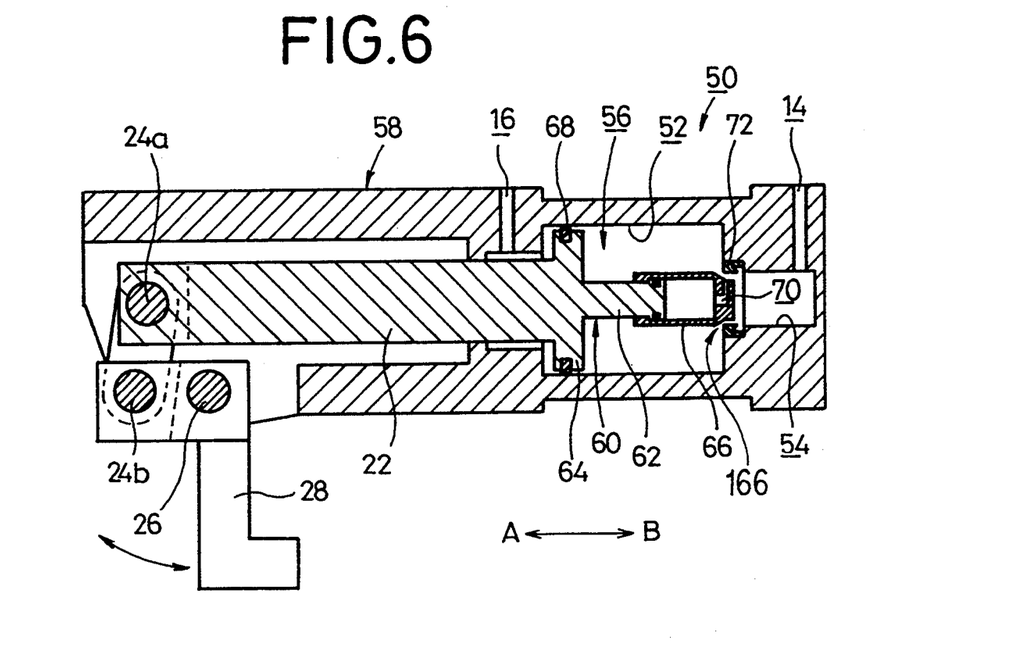
FIG. 6 is a vertical cross-sectional view illustrating the manner in which the piston employed in the variable force cylinder device shown in FIG. 5 is situated in a terminal position of a piston stroke.

A variable force cylinder device according to a second embodiment of the present invention will be shown in FIGS. 5 and 6. In the following embodiment, the same elements of structure employed in the first embodiment are identified by like reference numerals and their detailed description will therefore be omitted.

The variable force cylinder device 50 according to the second embodiment comprises a cylinder body 58 having a cylinder chamber 56 made up of a large-bore portion 52 and a small-bore portion 54 and a piston 60 slidably displaced within the cylinder chamber 56 of the cylinder body 58. The piston 60 has a small-diameter portion 62 having a small pressure-receiving area and a large-diameter portion 64 having a large pressure-receiving area. A cylindrical member 66, which surrounds the small-diameter portion 62 and is elastically coupled to the small-diameter portion 62, is provided on the outer peripheral surface of the small-diameter portion 62 (see FIGS. 5 and 6). Incidentally, a ring-shaped sealing member 68 pressed against the cylinder chamber 56 is secured to the large-diameter portion 64 of the piston 60. A pressurized-fluid introduction hole 70 is defined in a leading end portion of the cylindrical member 66. A sealing member 72, which is brought into sliding contact with the outer peripheral surface of the cylindrical member 66, is provided within the small-bore portion 54 in the cylinder chamber 56.

The pressurized fluid introduced through the port 14 of the variable force cylinder device 50 according to the second embodiment is pressed against the pressure-receiving area of the small-diameter portion 62 through the introduction hole 70 of the cylindrical member 66 so as to move the piston 60 in the direction indicated by the arrow A. Cylindrical member 66 has an end portion 166 whose outer diameter is reduced. Since, the pressure-receiving area of the small-diameter portion 62 is small, the force acting on the piston 60 in the direction indicated by the arrow A is relatively weak. An arm 28 is rotated a predetermined angle about a crank pin 26 together with the displacement of the piston 60. Since, the sealing member 72 slides ion the outer peripheral surface of the cylindrical member 66, a sealing effect is exhibited.

Next, when the piston 60 is displaced in the direction indicated by the arrow A and approaches a position where the reciprocating motion of the piston 60 is terminated, the cylindrical member 66 is detached from the sealing member 72 so that the pressurized fluid introduced through the port 14 acts on the large-diameter portion 64 of the piston 60 as a pressure-receiving surface. Therefore, the pressure-receiving area is changed from that of the small-diameter portion 62 to that of the large-diameter portion 64, and the force acting on the piston 60 in the terminal direction becomes strong. Thus, when the piston 60 has reached the terminal position of its stroke, a relatively strong force is transmitted to the arm 28 to thereby enable a workpiece to be reliably clamped.

Third Embodiment

Figure 7:
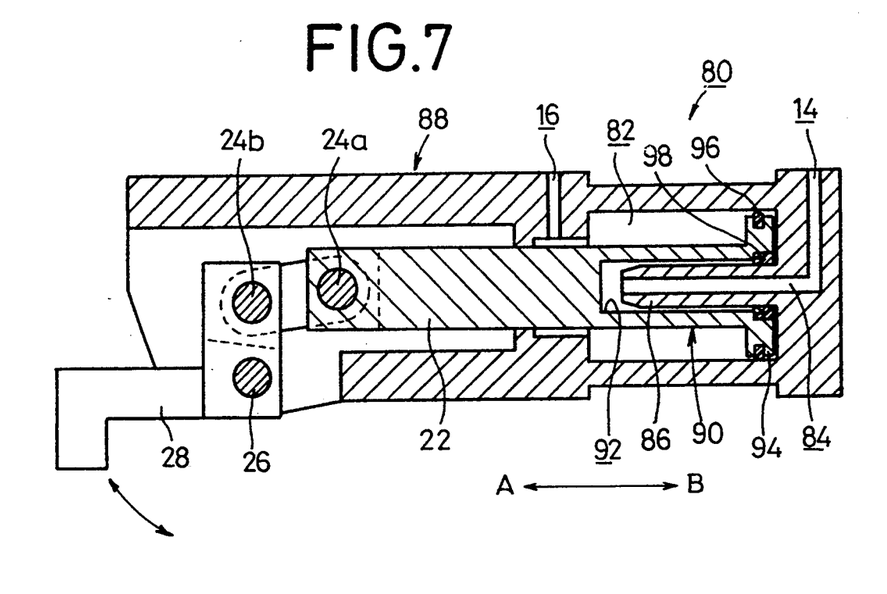
FIG. 7 is a vertical cross-sectional view depicting the manner in which a piston employed in a third embodiment of the present invention is situated in a starting position.
Figure 8:
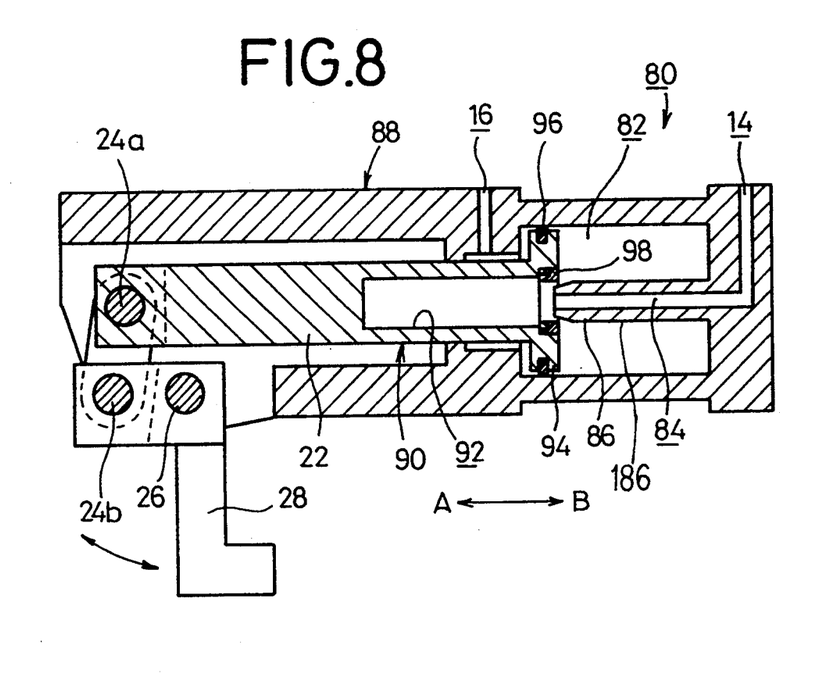
FIG. 8 is a vertical cross-sectional view showing the manner in which the piston employed in the variable force cylinder device shown in FIG. 7 is situated in a terminal position of a piston stroke.

A variable force cylinder device 80 according to a third embodiment of the present invention will now be illustrated in FIGS. 7 and 8.

The variable force cylinder device 80 comprises a cylinder body 88 having a projection 86 with a communication path 84 communicating with a pressurized fluid discharge/intake port 14 defined in a cylinder chamber 82, and a piston 90 slidably displaced in the cylinder chamber 82 of the cylinder body 88. Projection 86 includes a nozzle 186. The piston 90 has a blind hole 92, whose bottom face acts as a small-diameter portion of the piston 90, in which the projection 86 can enter, and a large-diameter portion 94 having a large pressure-receiving area. Incidentally, a sealing member 96 pressed against the inner wall of the cylinder chamber 82 is mounted on the large-diameter portion 94 of the piston 90, whereas a sealing member 98 brought into sliding contact with the outer peripheral surface of the projection 86 is provided at an entrance position of the blind hole 92. In the variable force cylinder device 80 according to the present embodiment, the cylinder chamber 82 is set to the same diameter unlike the variable force cylinder devices according to the aforementioned embodiments.

A pressurized fluid introduced from the port 14 and through the communication path 84 in the projection 86 of the cylinder 80 according to the third embodiment, acts on the bottom face of the blind hole 92 to thereby move the piston 90 in the direction indicated by an arrow A. Since the pressure-receiving area of the blind hole 92 is small, the force acting on the piston 90 in the direction of termination of a piston stroke is relatively weak. In this situation, the sealing member 98 is pressed against the outer peripheral surface of the projection 98 so as to exhibit a sealing effect.

Next, when the piston 90 is shifted in the direction indicated by the arrow A and approaches a position where the reciprocating motion of the piston 90 is terminated as shown in FIG. 8, the sealing member 98 is detached from the outer peripheral surface of the projection 86 and hence the pressurized fluid introduced through the port 14 is pressed against the large-diameter portion 94 of the piston 90 as a pressure-receiving surface. Therefore, when the pressure-receiving area is changed from a small one to a large one, the force acting on the piston 90 in the direction of termination of its stroke becomes relatively strong. Thus, when the piston 90 is situated in the terminal position of its stroke and the arm 28 is rotated the predetermined angle, a relatively strong force is transmitted to the arm 28 so that a workpiece can be reliably clamped.

Fourth Embodiment

Figure 9:
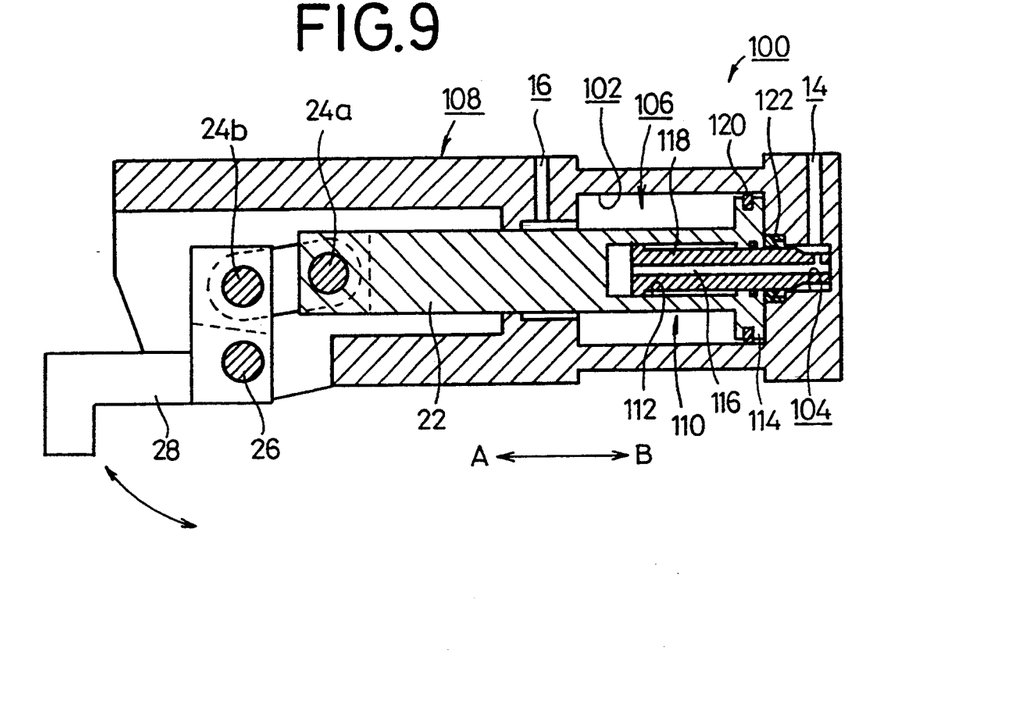
FIG. 9 is a vertical cross-sectional view illustrating the manner in which a piston employed in a variable force cylinder device according to a fourth embodiment of the present invention is situated in a starting position.
Figure 10:
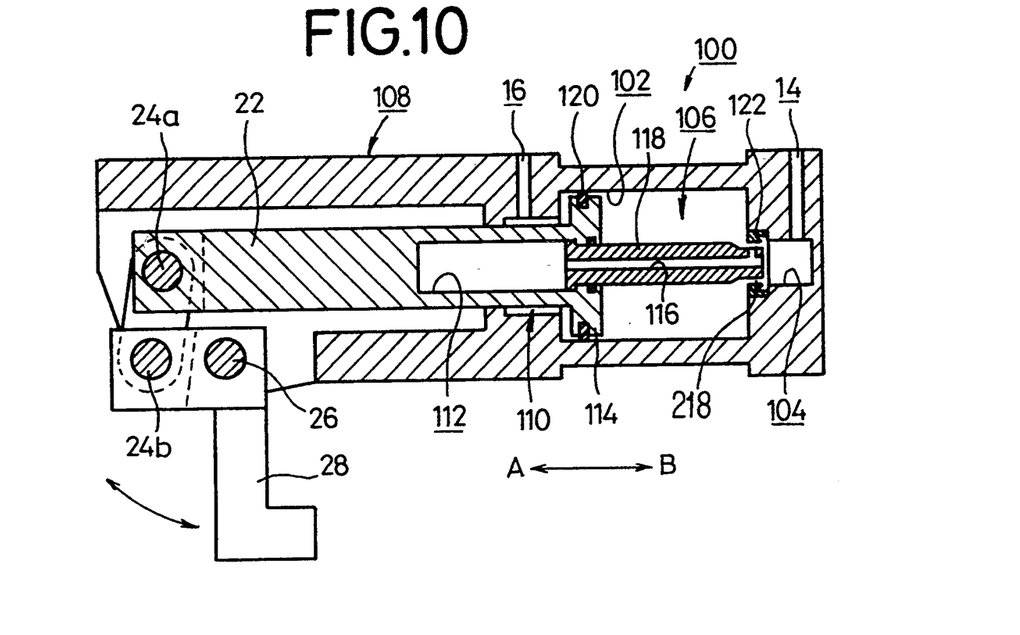
FIG. 10 is a vertical cross-sectional view depicting the manner in which the piston employed in the variable force cylinder device shown in FIG. 9 is situated in a terminal position of a piston stroke.

A variable force cylinder device 100 according to a fourth embodiment of the present invention will next be shown in FIGS. 9 and 10.

The variable force cylinder device 100 comprises a cylinder body 108 having a cylinder chamber 106 comprised of a large-bore portion 102 and a small-bore portion 104. A piston 110 has a blind hole 112 having the bottom face as a small pressure-receiving area and a large-diameter portion 114 having a large pressure-receiving area. A rod member 118 having a communication path 116 defined therein, which communicates with a pressurized fluid discharge/intake port 14, is slidably fitted in the blind hole 112 so as to be capable of expansion or contraction. Rod member 118 includes an end portion 218 whose outer diameter is reduced.

Incidentally, a sealing member 120 pressed against the large-bore portion 102 in the cylinder chamber 106 is mounted on the large-diameter portion 114 of the piston 110, whereas a sealing member 122 brought into sliding contact with the outer peripheral surface of the rod member 118 is provided inside of the small bore portion 104.

Operation of the variable force cylinder device 100 according to the fourth embodiment will now be described below. A pressurized fluid introduced through the port 14 acts on the bottom face of the blind hole 112 having the small pressure-receiving are through the communication path or through hole 116 of the rod member 118 to thereby move the piston 110 in the direction indicated by an arrow A. Since the pressure-receiving area of the blind hole 112 is small, the force acting on the piston 110 in the direction of termination of its stroke is relatively weak. The sealing member 122 mounted on the inner wall of the small-bore portion 104 can be pressed against the outer peripheral surface of the rod member 118 so as to exhibit a sealing effect.

Next, when the piston 110 is further moved in the direction indicated by the arrow A and reaches the position shown in FIG. 10, the sealing member 122 is detached from the outer peripheral surface of the rod member 118 so that the pressurized fluid introduced through the port 14 acts on the large-diameter portion 114 of the piston 110 as a pressure-receiving surface. Therefore, since the pressure-receiving area is changed from a small one to a large one, the force acting on the piston 110 in the direction of its stroke becomes relatively strong. Thus, when the piston 110 is situated in a terminal position of the its stroke and the arm 28 is rotated the predetermined angle, a relatively strong force is transmitted to the arm 28 so that a workpiece can be reliably clamped.

Fifth Embodiment

Figure 11:
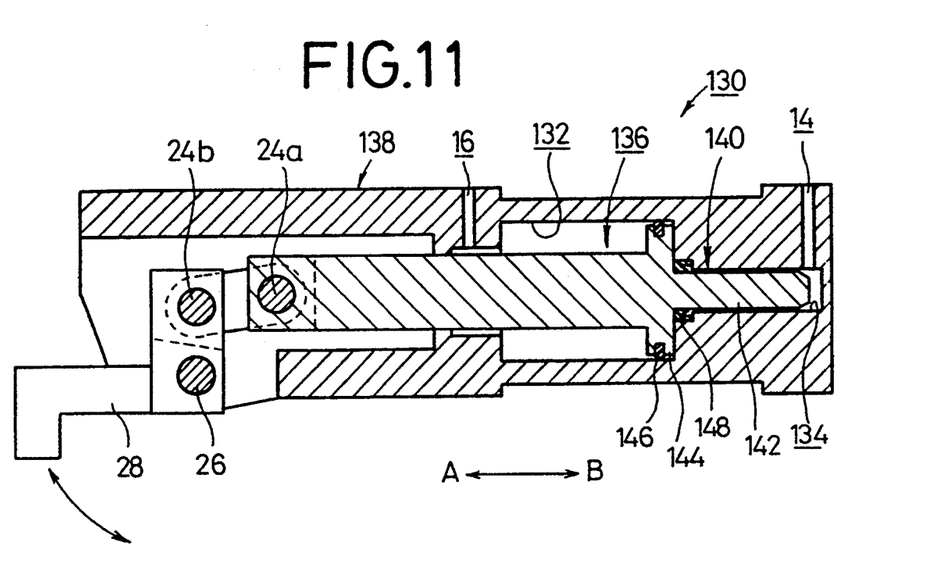
FIG. 11 is a vertical cross-sectional view showing the manner in which a piston employed in a variable force cylinder device according to a fifth embodiment of the present invention is situated in a starting position.
Figure 12:
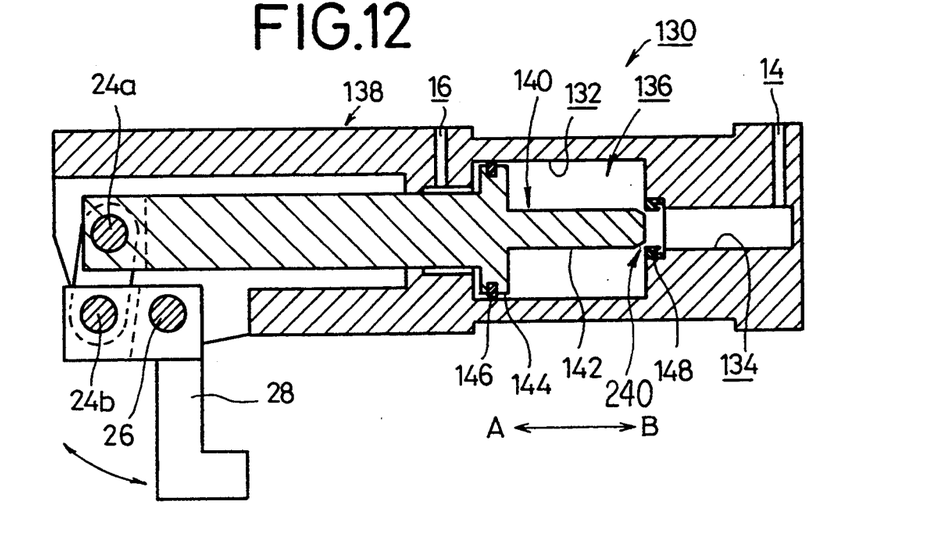
FIG. 12 is a vertical cross-sectional view illustrating the manner in which the piston employed in the variable force cylinder device shown in FIG. 11 is situated in a terminal position of a piston stroke.

A variable force cylinder device 130 according to a fifth embodiment of the present invention will next be shown in FIGS. 11 and 12.

The variable force cylinder device 130 comprises a cylinder body 138 having a cylinder chamber 136 made up of a large-bore portion 132 and a small-bore portion 134. A piston 140 has a small-diameter portion 142 having a small pressure-receiving area, a reduced diameter portion 240, and a large-diameter portion 144 having a large pressure-receiving area.

Incidentally, a sealing member 146 pressed against the inner wall of the cylinder chamber 136 is mounted on the large-diameter portion 144. Further, a sealing member 148 brought into sliding contact with the outer peripheral surface of the small-diameter portion 142 of the piston 140 is provided inside of the small-bore portion 134 in the cylinder chamber 136.

Operation of the variable force cylinder device 130 according to a fifth embodiment will now be described below. A pressurized fluid introduced through a pressurized fluid discharge/intake port 14 is supplied to the small-bore portion 134 so as to act on the pressure-receiving surface of the small-diameter portion 142 of the piston 140, thereby to move the piston 140 in the direction indicated by an arrow A. Since, the pressure-receiving area of the small-diameter portion 142 is small, the force acting on the piston 140 in the direction of termination of its stroke is relatively weak. The sealing member 148 provided inside of the small-bore portion 134 can be pressed against the outer peripheral surface of the small-diameter portion 142 of the piston 140 so as to exhibit a sealing effect.

Further, when the piston 140 is displaced in the direction indicated by the arrow A and approaches a position shown in FIG. 12 where the piston stroke is terminated, the sealing member 148 is detached from the outer peripheral surface of the small-diameter portion 142 so that the pressurized fluid introduced through the port 14 acts on the large-diameter portion 144 of the piston 140 as a pressure-receiving surface. Therefore, since the pressure-receiving area is changed from a small one to a large one, the force acting on the piston 140 in the direction of the termination of the piston stroke is relatively strong. Thus, when the piston 140 is situated in the terminal position of its stroke and the arm 28 is rotated the predetermined angle, a relatively strong force is transmitted to the arm 28 so that a workpiece can be reliably clamped.

Thus, when the pressure-receiving area of the piston is changed in the course the piston is moved from the start position to the terminal position of its stroke, the force acting on the piston can be varied. As a result, the clamping force of the clamping arm rotated in response to the reciprocating motion of the piston can be varied.

Having now fully described the invention, it will be apparent to those skilled in the art that many changes and modifications can be made without departing from the spirit or scope of the invention as set forth herein.

What is claimed is:

1. A Variable force cylinder device, comprising:
 a piston reciprocated by pressurized fluid in a cylinder chamber, said piston having a large-diameter portion and a small-diameter portion, said piston being connected to a piston rod having a diameter smaller than the diameters of said large-diameter portion and said small-diameter portion;
 a cylinder chamber having a large-bore portion which corresponds to said large-diameter portion of the piston, and a small-bore portion which corresponds to said small-diameter portion of the piston, wherein said large-diameter portion and said small-diameter portion are arranged in order in a direction of a descending stroke of the piston in which an end face of said large-diameter portion moves away from a bottom of said large bore portion;
 a first passageway introducing said pressurized fluid into the bottom of said larger bore portion when the piston is in said descending stroke;
 a second passageway introducing said pressurized fluid into a bottom of said small-bore portion when the piston is in an ascending stroke in which said end face of the large-diameter portion approaches the bottom of the large-bore portion; and
 a variable force mechanism varying a pressure-receiving area of the piston under a varying interaction of the piston with the cylinder chamber depending on the phases of a piston stroke, said variable force mechanism comprising:
 a ring member mounted around said large diameter portion, wherein a periphery of said ring member is in sliding contact with a wall surface of said large-bore portion and wherein said ring member includes a check valve allowing the pressurized fluid to leak only in the direction of said descending stroke; and
 a seal ring mounted around said small-diameter portion, said seal ring performing sealing only when said small-diameter portion is fitted in said small-bore portion during a final phase of said descending stroke.

2. A variable force cylinder device, comprising:
 a piston reciprocated by a pressurized fluid in a cylinder chamber, said piston having a large-diameter portion and a small-diameter portion, wherein said small-diameter portion of the piston includes a straight rod projecting from said large-diameter portion;
 a cylinder chamber having a large-bore portion which corresponds to said large-diameter portion of the piston and a small-bore portion which corresponds to said small-diameter portion of the piston, said large-diameter portion of the piston being fitted in said large-bore portion of the cylinder chamber and wherein said small-diameter portion and said large-diameter portion are arranged in order in a direction of a descending stroke of the piston in which an end face of said small-diameter portion moves away from a bottom of said small-bore portion;
 a first passageway introducing said pressurized fluid into the bottom of said small bore portion when the piston is in said descending stroke;
 a second passageway introducing said pressurized fluid into a bottom of said large-bore portion when the piston is in an ascending stroke in which said end face of the small-diameter portion approaches the bottom of the small-bore portion; and
 a variable force mechanism, said variable force mechanism varying a pressure-receiving area of the piston under a varying interaction of the piston with the cylinder chamber depending on the phases of a piston stroke, said variable force mechanism comprising:
 a cylindrical member slidably covering said straight rod in a fluid-tight manner, said cylindrical member having a hole defined in a bottom side thereof through which said pressurized fluid is introduced into said cylindrical member from said small-bore portion, said bottom side of said cylindrical member further including an end portion with a reduced outer diameter so that said pressurized fluid leaks into said large-bore portion through an annular space formed between said end portion and said small-bore portion during a final phase of said descending stroke, wherein said small-bore portion of said cylinder chamber is formed as a straight hole slidably receiving said cylindrical member in a fluid-tight manner until the final phase of said descending stroke is reached.

3. A variable force cylinder device, comprising:
 a piston reciprocated by a pressurized fluid in a cylinder chamber, said piston having a large-diameter portion and a small-diameter portion, wherein a pressure-receiving face of said small-diameter portion is provided as a bottom face of a blind hole bored into a piston body from an end face of said piston, said large-diameter portion being located at said end face;

a cylinder chamber having a large-bore portion over the entire length thereof which corresponds to said large-diameter portion of the piston, said large-diameter portion of the piston being fitted in said large-bore portion of the cylinder chamber;

a first passageway communicating with a nozzle for introducing said pressurized fluid into said blind hole when the piston is in a descending stroke in which said end face of the piston moves away from a bottom of the cylinder chamber from which said nozzle project is, said nozzle having a length identical to or shorter than stroke-length of said piston;

a second passageway introducing said pressurized fluid into said cylinder chamber when the piston is in an ascending stroke in which said end face of the piston approaches said bottom of the cylinder chamber; and a variable force mechanism varying a pressure-receiving area of the piston under a varying interaction of the piston with the cylinder chamber depending on the phases of a piston stroke, said variable force mechanism comprising:

an end portion of said nozzle, said end portion having a reduced outer diameter so that said pressurized fluid leaks into said cylinder chamber through an annular space formed between said end portion and said blind hole during a final phase of said descending stroke, wherein said nozzle is slidably and fluid-tightly received in said blind hole until the final phase of said descending stroke is reached.

4. A variable force cylinder device, comprising:

a piston reciprocated by a pressurized fluid in a cylinder chamber, said piston having a large-diameter portion and a small-diameter portion, wherein a pressure-receiving face of said small-diameter portion is provided as a bottom face of a blind hole bored into a piston body from an end face of said piston at a depth identical to or shorter than a stroke-length of said piston, said large-diameter portion being located at said end face;

a cylinder chamber having a large-bore portion which corresponds to said large-diameter portion of the piston and a small-bore portion, said large-diameter portion of the piston being fitted in said large-bore portion of the cylinder chamber, and wherein said small-bore portion and said large-bore portion are arranged in order in the direction of a descending stroke of the piston in which said end face of the piston moves away from a bottom of said large-bore portion which said end face faces;

a first passageway communicating with said small-bore portion and with a rod member for introducing said pressurized fluid into said blind hole through said rod member when the piston is in said descending stroke, said rod member being slidably disposed in said blind hole and interconnecting said blind hole and said small-bore portion;

a second passageway introducing said pressurized fluid into said large-bore portion of the cylinder chamber when the piston is in an ascending stroke in which said end face of the piston approaches the bottom of said large-bore portion; and a variable force mechanism varying a pressure-receiving area of the piston under a varying interaction of the piston with the cylinder chamber depending on the phases of a piston stroke, said variable force mechanism comprising:

a through-hole in said rod member, said pressurized fluid flowing though said through hole and acting on said bottom face of said blind hole, one end of said rod member being slidably and fluid-tightly received in said blind hole; and another end of said rod member having an end portion fitted in said small-bore portion, said end portion having a reduced outer diameter so that said pressurized fluid leaks into said large-bore portion through an annular space formed between said end portion and said small-bore portion during a final phase of said descending stroke, wherein said end portion of said rod member is slidably and fluid-tightly received in said small-bore portion until the final phase of said descending stroke is reached.

5. A variable force cylinder device, comprising:

a piston reciprocated by a pressurized fluid in a cylinder chamber, said piston having a large-diameter portion and a small-diameter portion, said small-diameter portion of the piston being formed as a straight rod having a length identical to or shorter than a stroke-length of the piston;

a cylinder chamber having a large-bore portion which corresponds to said large-diameter portion of the piston and a small-bore portion which corresponds to said small-diameter portion of the piston, said large-diameter portion of the piston being fitted in said large-bore portion of the cylinder chamber, and wherein said small-diameter portion and said large-diameter portion are arranged in order in a direction of a descending stroke of the piston in which an end face of said small-diameter portion moves away from a bottom of said small-bore portion;

a first passageway introducing said pressurized fluid into the bottom of said small-bore portion when the piston is in said descending stroke;

a second passageway introducing said pressurized fluid into a bottom of said large-bore portion when the piston is in an ascending stroke in which said end face of the small-diameter portion approaches the bottom of the small-bore portion;

a variable force mechanism varying a pressure-receiving area of the piston under a varying interaction of the piston with the cylinder chamber depending on the phases of a piston stroke, wherein said variable force mechanism comprises a mechanism causing the pressurized fluid to act primarily on an end face of said large diameter portion only after said piston has traversed a distance greater than one half of the total stroke-length of said piston, and an end portion of said small-diameter portion having a reduced outer diameter so that said pressurized fluid leaks into said large-bore portion of said cylinder chamber through an annular space formed between said end portion and said small-bore portion during a final phase of said descending stroke, wherein said small diameter portion is slidably and fluid-tightly received in said small-bore portion until the final phase of said descending stroke is reached.

* * * * *